United States Patent
Yan

(10) Patent No.: US 9,740,861 B2
(45) Date of Patent: Aug. 22, 2017

(54) METHOD FOR DETECTING EAVESDROPPING ACTIVITY AND TERMINAL DEVICE

(71) Applicant: Huawei Device Co., Ltd., Shenzhen (CN)

(72) Inventor: Yongjie Yan, Shenzhen (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 115 days.

(21) Appl. No.: 14/107,124

(22) Filed: Dec. 16, 2013

(65) Prior Publication Data

US 2014/0109224 A1    Apr. 17, 2014

Related U.S. Application Data

(63) Continuation of application No. PCT/CN2012/081670, filed on Sep. 20, 2012.

(51) Int. Cl.
*G06F 21/56* (2013.01)
*H04L 29/06* (2006.01)

(52) U.S. Cl.
CPC ........... *G06F 21/56* (2013.01); *G06F 21/567* (2013.01); *H04L 63/1408* (2013.01); *H04L 63/1475* (2013.01)

(58) Field of Classification Search
CPC ... G06F 21/56; G06F 21/567; H04L 63/1408; H04L 63/1475
USPC .......................................................... 726/23
See application file for complete search history.

(56) References Cited

U.S. PATENT DOCUMENTS

| | | | |
|---|---|---|---|
| 6,321,098 B1* | 11/2001 | Beith | H04M 1/274516 379/200 |
| 7,813,481 B1* | 10/2010 | Hursey | H04M 3/42221 379/202.01 |
| 2009/0165132 A1* | 6/2009 | Jain et al. | 726/22 |
| 2009/0271522 A1* | 10/2009 | Gupta et al. | 709/228 |
| 2011/0123018 A1 | 5/2011 | Chuang et al. | |
| 2012/0122524 A1 | 5/2012 | Kim | |

(Continued)

FOREIGN PATENT DOCUMENTS

| CN | 102045712 A | 5/2011 |
|---|---|---|
| CN | 102075610 A | 5/2011 |

(Continued)

OTHER PUBLICATIONS

Foreign Communication From a Counterpart Application, Chinese Application No. 2014-536100, Chinese Office Action dated Apr. 21, 2015, 4 pages.

(Continued)

*Primary Examiner* — Matthew Henning
(74) *Attorney, Agent, or Firm* — Conley Rose, P.C.

(57) ABSTRACT

A method for detecting an eavesdropping activity and a terminal device. The method includes determining whether a terminal device is in a conversation; when the terminal device is in a conversation, determining whether the terminal device has an application that starts a recording function; and when the terminal device has an application that starts a recording function, sending out an eavesdropping alarm prompt. By adopting the technical solutions of the present invention, an eavesdropping activity in a manner of recording may be detected.

24 Claims, 2 Drawing Sheets

(56) References Cited

U.S. PATENT DOCUMENTS

| | | | |
|---|---|---|---|
| 2013/0067388 A1* | 3/2013 | Celie | G06F 3/04847 715/781 |
| 2014/0074716 A1* | 3/2014 | Ni | G06F 21/51 705/44 |
| 2015/0050913 A1 | 2/2015 | Liang | |

FOREIGN PATENT DOCUMENTS

| | | |
|---|---|---|
| CN | 102572123 A | 7/2012 |
| EP | 2843979 A1 | 3/2015 |
| KR | 20120050613 A | 5/2012 |
| WO | 2008098870 A1 | 8/2008 |
| WO | 2013159726 A1 | 10/2013 |

OTHER PUBLICATIONS

Foreign Communication From a Counterpart Application, Chinese Application No. 2014-536100, English Translation of Chinese Office Action dated Apr. 21, 2015, 5 pages.
Partial English Translation and Abstract of Chinese Patent Application No. CN102045712A, Jan. 7, 2014, 3 pages.
Partial English Translation and Abstract of Chinese Patent Application No. CN102572123A, Jan. 7, 2014, 3 pages.
Foreign Communication From a Counterpart Application, PCT Application No. PCT/CN2012/081670, English Translation of Chinese Search Report dated Apr. 4, 2013, 2 pages.
Foreign Communication From a Counterpart Application, PCT Application No. PCT/CN2012/081670, Chinese Written Opinion dated Apr. 4, 2013, 4 pages.
Foreign Communication From a Counterpart Application, Korean Application No. 10-2013-7033037, Korean Office Action dated May 14, 2015, 6 pages.
Foreign Communication From a Counterpart Application, Korean Application No. 10-2013-7033037, English Translation of Korean Office Action dated May 14, 2015, 4 pages.
Notice of Allowance dated Aug. 6, 2015, European Application Serial No. 12877084.9, filed on Apr. 10, 2015, 7 pages.
Schlegel, R., et al., "Soundcomber: A Stealthy and Context-Aware Sound Trojan for Smartphones," Proceedings of the 18th Annual Network & Distributed System Security Symposium, 2011, 17 pages.
Cai, L., et al., "Defending Against Sensor-Sniffing Attacks on Mobile Phones," Proceedings of the 1st ACM workshop on networking, systems, and applications for mobile handhelds, MobiHeld, Aug. 17, 2009, pp. 31-36.
Foreign Communication From a Counterpart Application, Japanese Application No. 2014-536100, Japanese Notice of Allowance dated Feb. 16, 2016, 3 pages.

\* cited by examiner

METHOD FOR DETECTING EAVESDROPPING ACTIVITY AND TERMINAL DEVICE

CROSS-REFERENCE TO RELATED APPLICATIONS

This application is a continuation of International Application No. PCT/CN2012/081670, filed on Sep. 20, 2012, which is hereby incorporated by reference in its entirety.

TECHNICAL FIELD

The present invention relates to communications technologies, and in particular, to a method for detecting an eavesdropping activity and a terminal device.

BACKGROUND

With the popularity of intelligent terminals, a security problem of the intelligent terminals is increasingly highlighted. A current intelligent terminal generally provides powerful application programming interfaces (APIs), and through these APIs, conversation state information of the intelligent terminal can be obtained, conversation content can be recorded and a complete network connection function can be implemented. This also provides opportunities for some malicious application programming (APP) developers, who develop some illegal applications to use these APIs to intercept conversation content of users, and may also release the intercepted conversation content to the Internet through the network connection function of the intelligent terminal, thereby causing privacy leakage of the users. Therefore, it can be seen that performing detection and precautions on an eavesdropping activity on the intelligent terminal becomes rather important.

Currently, although some software has an anti-eavesdropping function, it is found in an actual application that, the software cannot detect all eavesdropping activities, for example, eavesdropping in a manner of recording cannot be detected. Therefore, a method that can detect this kind of eavesdropping activities is needed.

SUMMARY

Embodiments of the present invention provide a method for detecting an eavesdropping activity and a terminal device, which are used to detect an eavesdropping activity in a manner of recording.

A first aspect provides a method for detecting an eavesdropping activity, where the method includes: determining whether a terminal device is in a conversation; if the terminal device is in a conversation, determining whether the terminal device has an application that starts a recording function; and if the terminal device has an application that starts a recording function, sending out an eavesdropping alarm prompt.

In a first possible implementation manner of the first aspect, the eavesdropping alarm prompt includes a first-grade eavesdropping alarm prompt and a second-grade eavesdropping alarm prompt; and the sending out an eavesdropping alarm prompt includes: determining whether the application that starts a recording function is connecting to a network; if the application that starts a recording function is not connecting to a network, sending out the first-grade eavesdropping alarm prompt; and if the application that starts a recording function is connecting to a network, sending out the second-grade eavesdropping alarm prompt.

In combination with the first aspect or the first possible implementation manner of the first aspect, in a second possible implementation manner of the first aspect, the method for detecting an eavesdropping activity further includes receiving an instruction for terminating the application that starts a recording function, and terminating the application that starts a recording function according to the instruction.

In combination with the second possible implementation manner of the first aspect, in a third possible implementation manner of the first aspect, the method for detecting an eavesdropping activity further includes recording an identity ID of the application that starts a recording function and an operation activity of terminating the application that starts a recording function to directly terminate the application that starts a recording function when it is again detected that the application that starts a recording function is running.

In combination with the first aspect or the first possible implementation manner of the first aspect or the second possible implementation manner of the first aspect or the third possible implementation manner of the first aspect, in a fourth possible implementation manner of the first aspect, the determining whether a terminal device is in a conversation includes: periodically querying for a working state of a communication module of the terminal device, and if the communication module is in a communication state, determining that the terminal device is in a conversation; or receiving a communication state indication reported by a communication module, where the communication state indication is reported by the communication module after the communication module enters a communication state, and determining, according to the communication state indication, that the terminal device is in a conversation.

In combination with the fourth possible implementation manner of the first aspect, in a fifth possible implementation manner of the first aspect, before the receiving a communication state indication reported by a communication module, the method includes sending a first registration request to the communication module, where the first registration request is used for enabling the communication module to report the communication state indication when the communication module enters the communication state.

In combination with the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner of the first aspect, the determining whether the terminal device has an application that starts a recording function includes: periodically querying for a working state of a recording service module of the terminal device, and if the recording service module is in a recording state, determining that the terminal device has an application that starts a recording function; or receiving a recording notification message reported by a recording service module, where the recording notification message is reported by the recording service module after the recording service module enters a recording state, and determining, according to the recording notification message, that the terminal device has an application that starts a recording function.

In combination with the sixth possible implementation manner of the first aspect, in a seventh possible implementation manner of the first aspect, before the receiving a recording notification message reported by a recording service module, the method includes sending a second registration request to the recording service module, where the second registration request is used for enabling the recording service module to report the recording notification message when the recording service module enters the recording state.

In combination with the first possible implementation manner of the first aspect or the second possible implementation manner of the first aspect or the third possible implementation manner of the first aspect or the fourth possible implementation manner of the first aspect or the fifth possible implementation manner of the first aspect or the sixth possible implementation manner of the first aspect or the seventh possible implementation manner of the first aspect, in an eighth possible implementation manner of the first aspect, the determining whether the application that starts a recording function is connecting to a network includes: acquiring an ID of the application that starts a recording function; and according to the ID of the application that starts a recording function, periodically querying for a network layer interface of the terminal device, and if the application that starts a recording function sends or receives network data through the network layer interface, determining that the application that starts a recording function is connecting to a network.

A second aspect provides a terminal device, including: a first determining module configured to determine whether the terminal device is in a conversation; a second determining module configured to, when a determination result of the first determining module is yes, determine whether the terminal device has an application that starts a recording function; and an alarm prompt module configured to, when a determination result of the second determining module is yes, send out an eavesdropping alarm prompt.

In a first possible implementation manner of the second aspect, the eavesdropping alarm prompt includes a first-grade eavesdropping alarm prompt and a second-grade eavesdropping alarm prompt; and the terminal device further includes: a third determining module configured to, when the determination result of the second determining module is yes and before the alarm prompt module sends out the eavesdropping alarm prompt, determine whether the application that starts a recording function is connecting to a network; and the alarm prompt module is specifically configured to, when a determination result of the third determining module is no, send out the first-grade eavesdropping alarm prompt, and when the determination result of the third determining module is yes, send out the second-grade eavesdropping alarm prompt.

In combination with the second aspect or the first possible implementation manner of the second aspect, in a second possible implementation manner of the second aspect, the terminal device further includes: a receiving module configured to receive an instruction for terminating the application that starts a recording function; and a terminating module configured to terminate the application that starts a recording function according to the instruction.

In combination with the second possible implementation manner of the second aspect, in a third possible implementation manner of the second aspect, the terminal device further includes a recording module configured to record an identity (ID) of the application that starts a recording function and an operation activity of terminating the application that starts a recording function to directly terminate the application that starts a recording function when it is again detected that the application that starts a recording function is running.

In combination with the second aspect or the first possible implementation manner of the second aspect or the second possible implementation manner of the second aspect or the third possible implementation manner of the second aspect, in a fourth possible implementation manner of the second aspect, the terminal device further includes a communication module, where the first determining module is specifically configured to periodically query for a working state of the communication module, and if the communication module is in a communication state, determine that the terminal device is in a conversation; or the first determining module is specifically configured to receive a communication state indication reported by the communication module, where the communication state indication is reported by the communication module after the communication module enters a communication state, and determine, according to the communication state indication, that the terminal device is in a conversation.

In combination with the fourth possible implementation manner of the second aspect, in a fifth possible implementation manner of the second aspect, the first determining module is further configured to, before receiving the communication state indication, send a first registration request to the communication module, where the first registration request is used for enabling the communication module to report the communication state indication when the communication module enters the communication state.

In combination with the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in a sixth possible implementation manner of the second aspect, the terminal device further includes: a recording service module, where the second determining module is specifically configured to periodically query for a working state of the recording service module, and if the recording service module is in a recording state, determine that the terminal device has an application that starts a recording function; or the second determining module is specifically configured to receive a recording notification message reported by the recording service module, where the recording notification message is reported by the recording service module after the recording service module enters a recording state, and determine, according to the recording notification message, that the terminal device has an application that starts a recording function.

In combination with the sixth possible implementation manner of the second aspect, in a seventh possible implementation manner of the second aspect, the second determining module is further configured to, before receiving the recording notification message, send a second registration request to the recording service module, where the second registration request is used for enabling the recording service module to report the recording notification message when the recording service module enters the recording state.

In combination with the first possible implementation manner of the second aspect or the second possible implementation manner of the second aspect or the third possible implementation manner of the second aspect or the fourth possible implementation manner of the second aspect or the fifth possible implementation manner of the second aspect or the sixth possible implementation manner of the second aspect or the seventh possible implementation manner of the second aspect, in an eighth possible implementation manner of the second aspect, the terminal device further includes a network layer interface, where the third determining module is specifically configured to acquire an ID of the application that starts a recording function, periodically query for the network layer interface according to the ID of the application that starts a recording function, and if the application that starts a recording function sends or receives network data through the network layer interface, determine that the application that starts a recording function is connecting to a network.

A third aspect provides a terminal device, including at least one processor and a memory, where the memory is configured to store an executable program code, and the processor reads the executable program code stored in the memory to run a program corresponding to the executable program code to be configured to: determine whether the terminal device is in a conversation; if the terminal device is in a conversation, determine whether the terminal device has an application that starts a recording function; and if the terminal device has an application that starts a recording function, send out an eavesdropping alarm prompt.

In the method for detecting an eavesdropping activity and the terminal device provided by the embodiments of the present invention, it is determined whether a terminal device is in a conversation, if the terminal device is in a conversation, it is further determined whether the terminal device has an application that starts a recording function, and if the terminal device has an application that starts a recording function, it indicates that the application may be a malicious program that eavesdrops in a manner of recording, and an eavesdropping alarm prompt is sent out, thereby implementing detection of an eavesdropping activity in the manner of recording.

BRIEF DESCRIPTION OF DRAWINGS

To describe the technical solutions in the embodiments of the present invention or in the prior art more clearly, accompanying drawings for describing the embodiments or the prior art are introduced briefly in the following. The accompanying drawings in the following description are only some embodiments of the present invention, and persons of ordinary skill in the art may further derive other drawings according to these accompanying drawings without creative efforts.

DESCRIPTION OF EMBODIMENTS

In order to make the objectives, technical solutions, and advantages in the embodiments of the present invention more comprehensible, the technical solutions in the embodiments of the present invention are clearly described in the following with reference to the accompanying drawings in the embodiments of the present invention. The embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
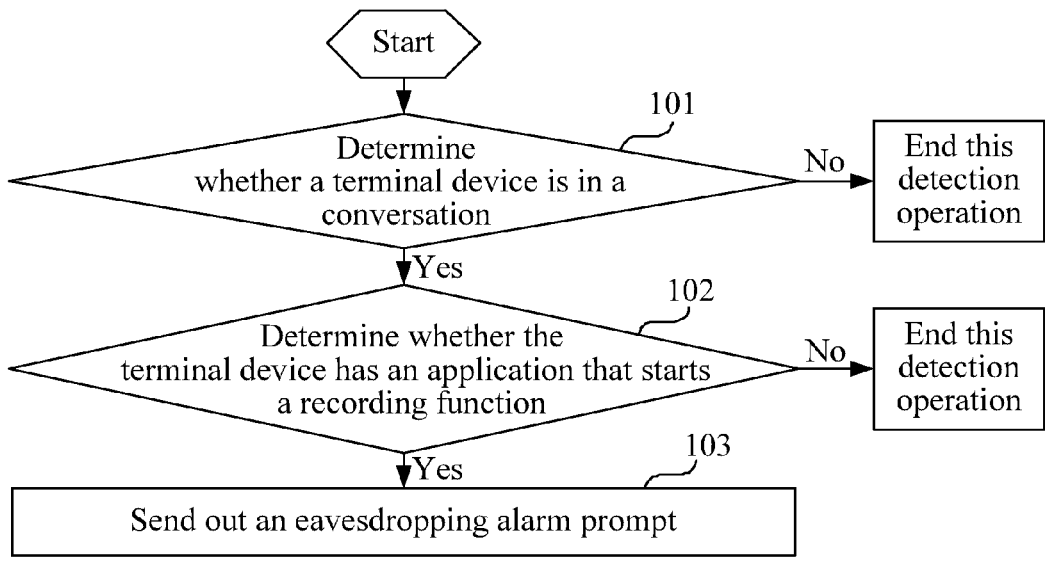
FIG. 1 is a flow chart of a method for detecting an eavesdropping activity according to an embodiment of the present invention.

FIG. 1 is a flow chart of a method for detecting an eavesdropping activity according to an embodiment of the present invention. As shown in FIG. 1, the method of this embodiment includes:

Step 101: Determine whether a terminal device is in a conversation; if a determination result is yes, that is, the terminal device is in a conversation, step 102 is performed; and if the determination result is no, this detection operation may be ended optionally.

Step 102: Determine whether the terminal device has an application that starts a recording function, if a determination result is yes, that is, the terminal device has an application that starts a recording function, step 103 is performed; and if the determination result is no, this detection operation may be ended optionally.

Step 103: Send out an eavesdropping alarm prompt.

An execution body of this embodiment may be a security module. The security module may be disposed in the terminal device for implementation, and may also be independent of the terminal device but connect to the terminal device. In addition, in this embodiment, it is taken as an example that the execution body is the security module, but the execution body is not limited to this module, and any module that may implement a process provided by this embodiment is applicable.

The terminal device in this embodiment may be various devices that have a conversation function and support a recording function, and for example, may be a mobile phone, a personal computer, a notebook computer, a personal digital assistant or a tablet computer.

Generally, a conversation state of the terminal device includes being in a conversation, an idle state and a ringing state. Eavesdropping in a manner of recording is generally implemented by recording conversation content during a conversation process of the terminal device. The security module first determines whether the terminal device is in a conversation, and if the terminal device is in a conversation, further determines whether the terminal device has an application that starts a recording function; if the terminal device has an application that starts a recording function, because the application satisfies a characteristic of recording in the conversation process of the terminal device, the application that starts a recording function may be a malicious program that eavesdrops in the manner of recording, and in this case, the security module sends out an eavesdropping alarm prompt to a user.

In this embodiment, the security module sends out different grades of eavesdropping alarm prompts according to probability of whether the application is a malicious program. With the increase of a grade of an eavesdropping alarm prompt, it indicates that probability of determining that the application that starts a recording function is a malicious program that eavesdrops in the manner of recording gets higher. Based on this, the eavesdropping alarm prompt of this embodiment may include a first-grade eavesdropping alarm prompt and a second-grade eavesdropping alarm prompt, where the second-grade eavesdropping alarm prompt is of a higher grade than the first-grade eavesdropping alarm prompt.

In the foregoing process, if it is determined that the terminal device is not in a conversation, or if it is determined that the terminal device is in a conversation but the terminal device does not have the application that starts a recording function, it may be determined that the terminal device does not have a malicious program that eavesdrops in the manner of recording, and therefore, it may be selected to end this detection operation.

In the method for detecting an eavesdropping activity provided by this embodiment, a security module determines whether a terminal device is in a conversation, and if the terminal device is in a conversation, further determines whether the terminal device has an application that starts a recording function; if the terminal device has an application that starts a recording function, it indicates that the application may be a malicious program that eavesdrops in a manner of recording, and the security module sends out an eavesdropping alarm prompt, thereby implementing detection of an eavesdropping activity in the manner of recording.

Figure 2:
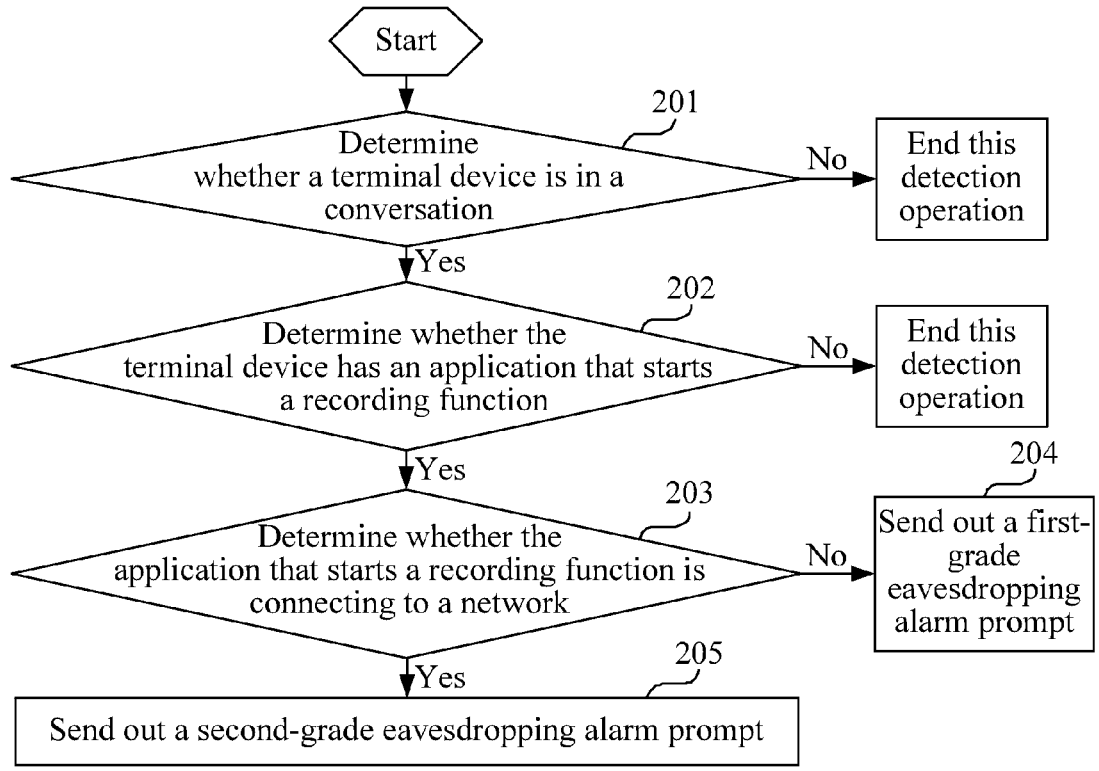
FIG. 2 is a flow chart of a method for detecting an eavesdropping activity according to another embodiment of the present invention.

FIG. 2 is a flow chart of a method for detecting an eavesdropping activity according to another embodiment of the present invention. As shown in FIG. 2, the method of this embodiment includes:

Step 201: Determine whether a terminal device is in a conversation; if a determination result is yes, that is, the terminal device is in a conversation, step 202 is performed; and if the determination result is no, this detection operation may be ended optionally.

Step 202: Determine whether the terminal device has an application that starts a recording function, if a determination result is yes, that is, the terminal device has an application that starts a recording function, step 203 is performed; and if the determination result is no, this detection operation may be ended optionally.

Step 203: Determine whether the application that starts a recording function is connecting to a network, if a determination result is yes, that is, the application that starts a recording function is connecting to a network, step 205 is performed; and if the determination result is no, that is, the application that starts a recording function is not connecting to a network, step 204 is performed.

Step 204: Send out a first-grade eavesdropping alarm prompt.

Step 205: Send out a second-grade eavesdropping alarm prompt.

An execution body of this embodiment may also be, for example, a security module, and reference may be made to the description in the embodiment shown in FIG. 1 for description of the security module. Further, reference may also be made to the description in the embodiment shown in FIG. 1 for description of the terminal device in this embodiment.

In this embodiment, an eavesdropping alarm prompt includes a first-grade eavesdropping alarm prompt and a second-grade eavesdropping alarm prompt. To detect a malicious program that eavesdrops in a manner of recording, the security module first determines whether the terminal is in a conversation, and if the terminal device is in a conversation, further determines whether the terminal device has an application that starts a recording function; if the terminal device has an application that starts a recording function, because the application satisfies a characteristic of recording in a conversation process of the terminal device, the application that starts a recording function may be a malicious program that eavesdrops in the manner of recording. In further consideration that a malicious program that eavesdrops in the manner of recording generally may also use a network connection function of the terminal device to upload conversation content obtained through eavesdropping to the Internet, the security module in this embodiment further determines whether the application that starts a recording function is connecting to a network (that is, whether the application that starts a recording function is being in a network connection state), and if a determination result is that the application that starts a recording function is connecting to a network (that is, in a network connection state), because the application satisfies both conditions of starting the recording function when the terminal device is in a conversation and connecting to a network, it is more likely that the application is a malicious program that eavesdrops in the manner of recording, so that the security module sends out an eavesdropping alarm prompt of a higher grade, that is, the second-grade eavesdropping alarm prompt, to a user. If the determination result is that the application that starts a recording function is not connecting to a network (that is, not in a network connection state), it indicates the probability that the application that starts the recording function but is not connecting to a network is a malicious program that eavesdrops in the manner of recording is low, and the security module sends out the first-grade eavesdropping alarm prompt to the user.

In an optional implementation manner, the eavesdropping alarm prompt sent out by the security module (for example, the first-grade eavesdropping alarm prompt or the second-grade eavesdropping alarm prompt sent out by the security module) may be sent out in a manner of sound, light, vibration and/or information. For example, the security module may send out an eavesdropping alarm prompt in the manner of sound, and different grades of eavesdropping alarm prompts are distinguished by volume of sound, for example, sound of the first-grade eavesdropping alarm prompt is relatively low, and sound of the second-grade eavesdropping alarm prompt is relatively high. For another example, the security module may further send out an eavesdropping alarm prompt in the manner of vibration, and different grades of eavesdropping alarm prompts are distinguished by vibration strength, for example, vibration strength of the first-grade eavesdropping alarm prompt is relatively small, and vibration strength of the second-grade eavesdropping alarm prompt is relatively large. For another example, the security module may further send out an eavesdropping alarm prompt in the manner of information and a prompt tone, and different grades of eavesdropping alarm prompts are distinguished by volume of the prompt tone, for example, sound of the first-grade eavesdropping alarm prompt is relatively low, and sound of the second-grade eavesdropping alarm prompt is relatively high; in addition, different grades of eavesdropping alarm prompts may also be distinguished through information content, for example, information content of the first-grade eavesdropping alarm prompt is "50% chance of being a malicious program", and information content of the second-grade eavesdropping alarm prompt is "80% chance of being a malicious program". The security module may send out an eavesdropping alarm prompt in various manners in addition to the foregoing several examples, and details are not listed one by one herein.

In this embodiment, by distinguishing different grades of eavesdropping alarm prompts, it is facilitated that the user adopts different processing measures. For example, when a grade of an eavesdropping alarm prompt is relatively low, the user may ignore the prompt and perform no processing; and when a grade of an eavesdropping alarm prompt is relatively high, the user may perform processing in time, for example, terminate the application to prevent privacy leakage.

In an optional implementation manner, the user may select to terminate the application after the security module sends out the eavesdropping alarm prompt. The user may send out, to the security module, through a menu or a key or the like provided by the terminal device, an instruction for terminating the application. Correspondingly, the security module receives the instruction for terminating the application, and terminates the application according to the received instruction. Specifically, an operating system of the terminal device has an API for terminating an application, so that the security module may achieve, by invoking an API corresponding to the application in the operating system, a purpose of terminating the application. It should be noted herein that, the user may select to terminate the application after the security module sends out an eavesdropping alarm prompt of any grade, so that operation that the security module receives the instruction for terminating the application and terminates the application may be implemented after the security module sends out the first-grade eavesdropping alarm prompt, and may also be implemented after the security module sends out the second-grade eavesdropping alarm prompt.

Further optionally, if the security module receives the instruction for terminating the application, besides that the application is terminated according to the received instruction, an identity (ID) of the application and an operation activity of terminating the application may also be recorded, so that when it is again detected that the application is running, the application may be directly terminated according to the recorded operation activity of terminating, thereby reducing operation of the user while ensuring that user privacy is not leaked. Specifically, when it is detected that the terminal device has the application that starts a recording function, the security module may compare an ID of the detected application that starts a recording function with the ID of the recorded application, and if the ID of the detected application that starts a recording function belongs to the ID of the recorded application, the security module directly terminates the detected application that starts a recording function. In addition, the security module in this embodiment may acquire an ID of an application, for example, may acquire an ID of an application by invoking an API corresponding to the application, or an ID of an application may be provided by another module in the terminal device.

This embodiment provides the foregoing step 101 or the foregoing step 201, that is, provides several implementation manners of determining whether the terminal device is in a conversation. An implementation manner includes periodically querying for a working state of a communication module of the terminal device, and if the communication module is in a communication state, determining that the terminal device is in a conversation. A conversation state of the terminal device may be embodied by the working state of the communication module of the terminal device. The communication module of the terminal device may also be referred to as a telephone module, which is mainly configured to implement a conversation between the terminal device and another terminal device. If the communication module is currently in a communication state, that is, is communicating with another terminal device, it indicates that the terminal device where the communication module is located is in a conversation; if the communication module is currently in an idle state, it indicates that the terminal device where the communication module is located is in an idle state; and if the communication module is currently in a ringing state, that is, the communication module is ringing to request for communication with another terminal device or has not responded to a communication request from another terminal device, it indicates that the terminal device where the communication module is located is in a ringing state. This implementation manner belongs to a manner in which the security module determines whether the terminal device is in a conversation in a manner of actively polling the working state of the communication module.

Another implementation manner includes receiving a communication state indication reported by a communication module of the terminal device, where the communication state indication is reported by the communication module after the communication module enters a communication state; and determining, according to the received communication state indication, that the terminal device is in a conversation. In this implementation manner, if the communication module enters the communication state, the communication module actively reports, to the security module, the communication state indication indicating that the communication module enters the communication state, so that the security module may determine, according to whether the communication state indication is received, whether the terminal device is in a conversation, and if the communication state indication reported by the communication module is received, the security module may determine that the terminal device is in a conversation.

Optionally, a function of actively reporting the communication state indication to the security module may be added by expanding a function of the communication module. In this case, once entering the communication state, the communication module actively reports the communication state indication to the security module.

Further optionally, in order to improve flexibility of the communication module to actively report the communication state indication, the security module may send a first registration request to the communication module before receiving the communication state indication reported by the communication module, where the first registration request is used for enabling the communication module to report the communication state indication when the communication module enters the communication state, and in this case, the communication module may report merely according to a requirement of the security module.

The foregoing various provided implementation manners of determining whether the terminal device is in a conversation have advantages such as being simple and easy to be implemented, requiring small modifications to the terminal device, and being accurate in determination.

This embodiment provides the foregoing step 102 or the foregoing step 202, that is, provides several implementation manners of determining whether the terminal device has an application that starts a recording function. An implementation manner includes periodically querying for a working state of a recording service module of the terminal device, and if the recording service module is in a recording state, determining that the terminal device has an application that starts a recording function. The recording service module of the terminal device is mainly configured to record a sound source. Specifically, the operating system of the terminal device also provides an API corresponding to the recording service module, each application may start the recording service module to record by invoking the API of the recording service module, and correspondingly, if the application successfully starts the recording service module, it indicates that the application starts a recording function. In this process, the recording service module may also acquire information such as an ID and a name of the application. Based on this, the security module may determine, by actively polling the working state of the recording service module, whether the terminal device has an application that starts a recording function, and in addition, if necessary, the security module may further acquire, through the recording service module, information such as the ID of the application that starts a recording function.

Another implementation manner includes receiving a recording notification message reported by a recording service module, where the recording notification message is reported by the recording service module after the recording service module enters a recording state; and determining, according to the recording notification message, that the terminal device has the application that starts a recording function. In this implementation manner, when entering the recording state, the recording service module may actively report, to the security module, the recording notification message indicating that the recording service module enters the recording state, so that the security module may determine, according to whether the recording notification message reported by the recording service module is received, whether the terminal device has an application that starts a recording function, and if the recording notification message reported by the recording service module is received, the security module may determine that the terminal device has the application that starts a recording function.

Optionally, a function of actively reporting the recording notification message to the security module may be added by expanding a function of the recording service module. In this case, once entering the recording state, the recording service module actively reports the recording notification message to the security module.

Further optionally, in order to improve flexibility of the recording service module to actively report the recording notification message, the security module may send a second registration request to the recording service module before receiving the recording notification message reported by the recording service module, where the second registration request is used for enabling the recording service module to actively report the recording notification message when the recording service module enters the recording state, and in this case, the recording service module may report merely according to a requirement of the security module.

The foregoing various provided implementation manners of determining whether the terminal device has an application that starts a recording function have advantages such as being simple and easy to be implemented, requiring small modifications to the terminal device, and being accurate in determination.

This embodiment provides step 203, that is, provides an implementation manner of determining whether the application that starts a recording function is connecting to a network, where the implementation manner includes acquiring an ID of the application that starts a recording function, periodically querying for a network layer interface of the terminal device according to the ID of the application that starts a recording function, and if the application that starts a recording function sends or receives network data through the network layer interface, determining that the application that starts a recording function is connecting to a network. The network layer interface of the terminal device is mainly configured to transmit and receive network data between each application and the Internet, and may acquire, through an interface provided by the operating system of the terminal device, an ID of the application that exchanges network data with the Internet and the exchanged network data and the like. Based on this, the security module first acquires the ID of the application that starts a recording function, periodically queries for the network layer interface, and determines whether the network layer interface records the acquired ID of the application that starts a recording function; if the network layer interface records the acquired ID, it indicates that the application that starts a recording function is connecting to a network, and if the network layer interface does not record the acquired ID, it indicates that the application that starts a recording function is not connecting to a network.

It should be noted that, besides querying for the network layer interface through active polling, the security module may also expand a function of the network layer interface, so that the network layer interface may actively report, to the security module, the ID of the application that is connecting to a network. In this case, the security module may determine, according to the ID of the application that starts a recording function and the ID of the application reported by the network layer interface, whether the application that starts a recording function is connecting to a network.

Whether each application in the terminal device is connecting to a network may be determined by querying to check whether there is network data exchanged between the application and the Internet in the network layer interface of the terminal device, but the present invention is not limited thereto. For example, acquiring may also be performed by querying for attribute information of the application, where the attribute information of the application includes information about whether the application has a network connection function and whether the application is in a network connection state and the like.

The foregoing provided implementation manner of determining whether the terminal device is connecting to a network has advantages such as being simple and easy to be implemented and being accurate in determination.

To sum up, in this embodiment, it is determined whether a terminal device is in a conversation, if the terminal device is in a conversation, it is further determined whether the terminal device has an application that starts a recording function, and if the terminal device has an application that starts a recording function, it indicates that the application may be a malicious program that eavesdrops in a manner of recording, and it is further determined whether the application that starts a recording function is connecting to a network. If it is determined that the application that starts a recording function is connecting to a network at the same time, it indicates that probability that the application is a malicious program that eavesdrops in the manner of recording is higher, and different grades of eavesdropping alarm prompts are sent out according to different determination results, thereby implementing detection of an eavesdropping activity in the manner of recording and effectively avoiding privacy leakage of the user.

Figure 3:
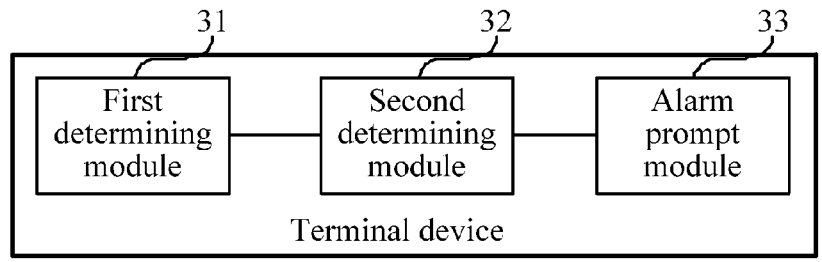
FIG. 3 is a schematic structural diagram of a terminal device according to an embodiment of the present invention.

FIG. 3 is a schematic structural diagram of a terminal device according to an embodiment of the present invention. The terminal device of this embodiment may be various devices that has a conversation function and supports a recording function. As shown in FIG. 3, the terminal device of this embodiment includes a first determining module 31, a second determining module 32 and an alarm prompt module 33.

The first determining module 31 is configured to determine whether the terminal device of this embodiment is in a conversation.

The second determining module 32 connects to the first determining module 31, and is configured to, when a determination result of the first determining module 31 is yes, determine whether the terminal device of this embodiment has an application that starts a recording function.

The alarm prompt module 33 connects to the second determining module 32, and is configured to, when a determination result of the second determining module 32 is yes, send out an eavesdropping alarm prompt.

Figure 4:
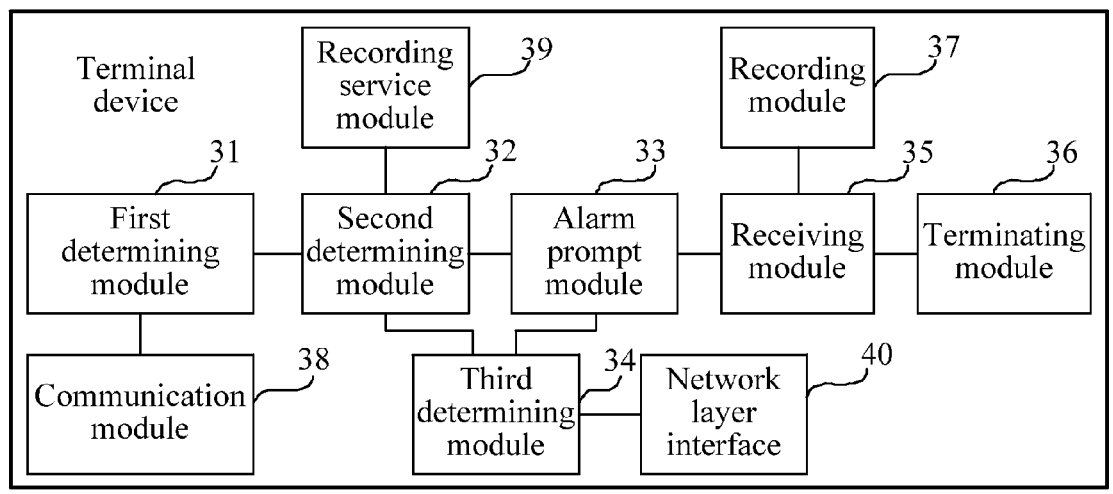
FIG. 4 is a schematic structural diagram of a terminal device according to another embodiment of the present invention.

In an optional implementation manner, the eavesdropping alarm prompt includes a first-grade eavesdropping alarm prompt and a second-grade eavesdropping alarm prompt. As shown in FIG. 4, the terminal device of this embodiment further includes a third determining module 34.

The third determining module 34 connects to the second determining module 32 and the alarm prompt module 33, and is configured to, when the determination result of the second determining module 32 is yes and before the alarm prompt module 33 sends out the eavesdropping alarm prompt, determine whether the application that starts a recording function determined by the second determining module 32 is connecting to a network.

Based on this, the alarm prompt module 33 is specifically configured to, when a determination result of the third determining module 34 is no, send out the first-grade eavesdropping alarm prompt, and when the determination result of the third determining module 34 is yes, send out the second-grade eavesdropping alarm prompt.

In an optional implementation manner, as shown in FIG. 4, the terminal device of this embodiment further includes a receiving module 35 and a terminating module 36.

The receiving module 35 is configured to receive an instruction for terminating the application that starts a recording function. Optionally, the receiving module 35 connects to the alarm prompt module 33, and is configured to, after the alarm prompt module 33 sends out the first-grade eavesdropping alarm prompt or the second-grade eavesdropping alarm prompt, receive the instruction for terminating the application that starts a recording function.

The terminating module 36 connects to the receiving module 35, and is configured to terminate the application that starts a recording function according to the instruction received by the receiving module 35.

Further optionally, as shown in FIG. 4, the terminal device of this embodiment further includes a recording module 37. The recording module 37 is configured to record an ID of the application that starts a recording function and an operation activity of terminating the application that starts a recording function to directly terminate the application that starts a recording function when it is again detected that the application that starts a recording function is running. Optionally, the recording module 37 connects to the receiving module 35, and is configured to, after the receiving module 35 receives the instruction for terminating the application that starts a recording function, record the ID of the application that starts a recording function and the operation activity of terminating the application that starts a recording function.

Further, as shown in FIG. 4, the terminal device of this embodiment further includes a communication module 38, mainly configured to implement a conversation between the terminal device of this embodiment and another terminal device. Based on this, the first determining module 31 may be specifically configured to periodically query for a working state of the communication module 38, and if the communication module 38 is in a communication state, determine that the terminal device of this embodiment is in a conversation. Or, the first determining module 31 may be specifically configured to receive a communication state indication reported by the communication module 38, where the communication state indication is reported by the communication module 38 after the communication module 38 enters a communication state, and determine, according to the communication state indication, that the terminal device of this embodiment is in a conversation. Further, the first determining module 31 may be further configured to, before receiving the communication state indication reported by the communication module 38, send a first registration request to the communication module 38, where the first registration request is used for enabling the communication module 38 to report the communication state indication when the communication module 38 enters the communication state.

Further, as shown in FIG. 4, the terminal device of this embodiment further includes a recording service module 39, mainly configured to record a sound source. Based on this, the second determining module 32 may be specifically configured to periodically query for a working state of the recording service module 39, and if the recording service module 39 is in a recording state, determine that the terminal device of this embodiment has the application that starts a recording function. Or, the second determining module 32 may be specifically configured to receive a recording notification message reported by the recording service module 39, where the recording notification message is reported by the recording service module 39 after the recording service module 39 enters a recording state, and determine, according to the recording notification message, that the terminal device of this embodiment has the application that starts a recording function. Further, the second determining module 32 may be further configured to, before receiving the recording notification message reported by the recording service module 39, send out a second registration request to the recording service module 39, where the second registration request is used for enabling the recording service module 39 to report the recording notification message when the recording service module 39 enters the recording state.

Further, as shown in FIG. 4, the terminal device of this embodiment further includes a network layer interface 40, mainly configured to transmit and receive network data between each application and the Internet, and further record an ID of the application that exchanges network data with the Internet and the exchanged network data and the like. Based on this, the third determining module 34 may be specifically configured to acquire an ID of the application that starts a recording function, periodically query for the network layer interface 40 according to the ID of the application that starts a recording function, and if the application that starts a recording function sends or receives network data through the network layer interface 40, determine that the application that starts a recording function is connecting to a network.

In an optional implementation manner, the alarm prompt module 33 may be specifically configured to send out an eavesdropping alarm prompt in a manner of sound, light, vibration and/or information. For example, the alarm prompt module 33 may be specifically configured to send out the first-grade eavesdropping alarm prompt in the manner of sound, light, vibration and/or information; or, the alarm prompt module 33 may be specifically configured to send out the second-grade eavesdropping alarm prompt in the manner of sound, light, vibration and/or information.

Each functional module of the terminal device provided by this embodiment may be configured to execute a corresponding process in the foregoing method embodiment, its specific working principle is not repeatedly described herein, and reference may be made to the description of the method embodiment for details.

In the terminal device provided by this embodiment, through various functional modules, it is determined whether the terminal device is in a conversation, and if the terminal device is in a conversation, it is further determined whether the terminal device has an application that starts a recording function; if the terminal device has an application that starts a recording function, it indicates that the application may be a malicious program that eavesdrops in a manner of recording, and an eavesdropping alarm prompt is sent out, thereby implementing detection of an eavesdropping activity in the manner of recording.

Figure 5:
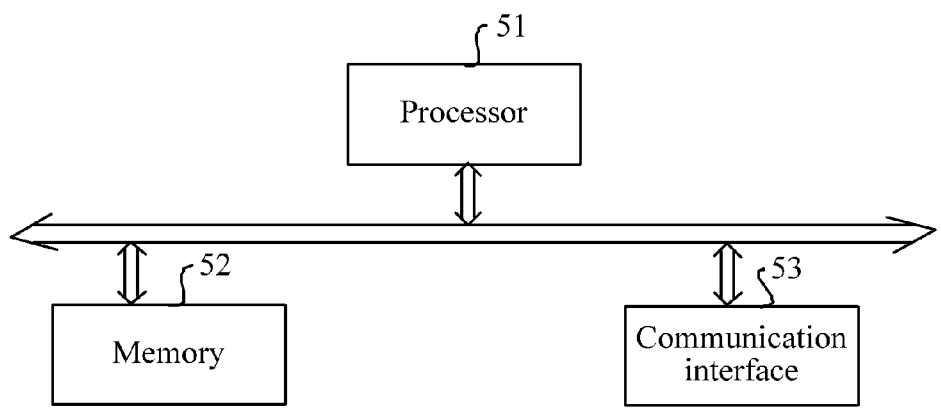
FIG. 5 is a schematic structural diagram of a terminal device according to still another embodiment of the present invention.

FIG. 5 is a schematic structural diagram of a terminal device according to still another embodiment of the present invention. As shown in FIG. 5, the terminal device of this embodiment includes at least one processor 51 and a memory 52, which are connected through a bus. The bus may be an industry standard architecture (ISA) bus, a peripheral component interconnect (PCI) bus or an extended industry standard architecture (EISA) bus, or the like. The bus may be classified into an address bus, a data bus, a control bus and so on. For ease of description, the bus in FIG. 5 is marked by merely a thick line, which does not mean that there is only one bus or one type of bus.

The memory 52 is configured to store an executable program code, and the processor 51 reads the executable program code stored in the memory 52 to run a program corresponding to the executable program code to be configured to: determine whether the terminal device of this embodiment is in a conversation; if the terminal device of this embodiment is in a conversation, determine whether the terminal device of this embodiment has an application that starts a recording function; and if the terminal device of this embodiment has the application that starts a recording function, send out an eavesdropping alarm prompt.

Further, as shown in FIG. 5, the terminal device of this embodiment further includes a communication interface 53. The communication interface 53 also connects to the processor 51 and the memory 52 through a bus. In addition, the terminal device of this embodiment further includes a power source module configured to supply power to another module of the terminal device. The power source module is not shown in FIG. 5.

The terminal device of this embodiment may be configured to execute a process in the foregoing method embodiment, its specific working principle is not repeatedly described herein, and reference may be made to the description of the method embodiment for details.

In the terminal device provided by this embodiment, it is determined whether the terminal device is in a conversation, and if the terminal device is in a conversation, it is further determined whether the terminal device has an application that starts a recording function; if the terminal device has an application that starts a recording function, it indicates that the application may be a malicious program that eavesdrops in a manner of recording, and an eavesdropping alarm prompt is sent out, thereby implementing detection of an eavesdropping activity in the manner of recording.

Persons of ordinary skill in the art should understand that all or a part of the steps of the foregoing method embodiments may be completed by a program instructing relevant hardware. The program may be stored in a computer readable storage medium. When the program is run, the steps of the foregoing method embodiments are performed. The storage medium may be any medium that is capable of storing program code, such as a read only memory (ROM), a random access memory (RAM), a magnetic disk or an optical disc.

Finally, it should be noted that the foregoing embodiments are merely provided for describing the technical solutions of the present invention, but not intended to limit the present invention. Although the present invention has been described in detail with reference to the foregoing embodiments, persons of ordinary skill in the art should understand that they may still make modifications to the technical solutions recorded in the foregoing embodiments, or equivalent replacements to part or all of technical features in the technical solutions; however, these modifications or replacements do not cause the essence of the corresponding technical solutions to depart from the scope of the technical solutions of the embodiments of the present invention.

What is claimed is:

1. A method for detecting an eavesdropping activity, comprising:
   determining, by a mobile phone, whether the mobile phone is participating in a conversation;
   determining, by the mobile phone, whether the mobile phone has an application that starts a recording function when the mobile phone is participating in the conversation;
   determining, by the mobile phone, whether the application that starts the recording function is connected to a network;
   sending out, by the mobile phone, a first-grade eavesdropping alarm prompt when the application that starts the recording function is not connected to the network, wherein the first-grade eavesdropping alarm prompt is at least one of a first volume of sound or a first strength of vibration;
   sending out, by the mobile phone, a second-grade eavesdropping alarm prompt when the application that starts the recording function is connected to the network, wherein the second-grade eavesdropping alarm prompt is at least one of a second volume of sound or a second strength of vibration;
   receiving, by the mobile phone, an instruction for terminating the application that starts the recording function;
   terminating, by the mobile phone, the application that starts the recording function according to an instruction received from the user;
   recording, by the mobile phone, an operation activity and an identity (ID) of the application that starts the recording function; and
   terminating, by the mobile phone, the application that starts the recording function according to the operation activity and the ID and without user interaction when the application that starts the recording function is running.

2. The method for detecting the eavesdropping activity according to claim 1, wherein determining, by the mobile phone, whether the application that starts the recording function is connected to the network comprises:
   acquiring the ID of the application that starts the recording function;
   periodically querying for a network layer interface of the mobile phone according to the ID of the application that starts the recording function; and
   determining that the application that starts the recording function is connected to the network when the application that starts the recording function sends or receives network data through the network layer interface.

3. The method for detecting the eavesdropping activity according to claim 1, wherein determining, by the mobile phone, whether the mobile phone is participating in the conversation comprises:
periodically querying for a working state of a communication module of the mobile phone; and
determining that the mobile phone is participating in the conversation when the communication module is in the communication state.

4. The method for detecting the eavesdropping activity according to claim 3, wherein before receiving by the mobile phone, the communication state indication reported by the communication module, the method further comprises sending, by the mobile phone, a first registration request to the communication module, and wherein the first registration request is used for enabling the communication module to report the communication state indication when the communication module enters the communication state.

5. The method for detecting the eavesdropping activity according to claim 1, wherein determining by the mobile phone, whether the mobile phone has the application that starts the recording function comprises:
periodically querying for a working state of a recording service module of the mobile phone; and
determining that the mobile phone has an application that starts the recording function when the recording service module is in a recording state.

6. The method for detecting the eavesdropping activity according to claim 5, wherein before receiving, by the mobile phone, the recording notification message reported by the recording service module, the method further comprises sending, by the mobile phone, a second registration request to the recording service module, and wherein the second registration request is used for enabling the recording service module to report the recording notification message when the recording service module enters the recording state.

7. The method for detecting the eavesdropping activity according to claim 1, wherein determining, by the mobile phone, whether the mobile phone is participating in the conversation comprises:
receiving a communication state indication reported by a communication module, wherein the communication state indication is reported by the communication module after the communication module enters a communication state; and
determining, according to the communication state indication, that the mobile phone is participating in the conversation.

8. The method for detecting the eavesdropping activity according to claim 1, wherein determining, by the mobile phone, whether the mobile phone has the application that starts the recording function comprises:
receiving a recording notification message reported by a recording service module, wherein the recording notification message is reported by the recording service module after the recording service module enters a recording state; and
determining, according to the recording notification message, that the mobile phone has the application that starts the recording function.

9. A mobile phone, comprising:
at least one processor; and
a memory,
wherein the memory is configured to store an executable program code, and
wherein the processor reads the executable program code stored in the memory to run a program corresponding to the executable program code such that the processor is configured to:
determine whether the mobile phone is participating in a conversation;
determine whether the mobile phone has an application that starts a recording function when the mobile phone is participating in the conversation;
determine whether the application that starts the recording function is connected to a network;
send out a first-grade eavesdropping alarm prompt when the application that starts the recording function is not connected to the network, wherein the first-grade eavesdropping alarm prompt is at least one of a first volume of sound or a first strength of vibration;
send out a second-grade eavesdropping alarm prompt when the application that starts the recording function is connected to the network, wherein the second-grade eavesdropping alarm prompt is at least one of a second volume of sound or a second strength of vibration;
receive an instruction for terminating the application that starts the recording function;
terminate the application that starts the recording function according to an instruction received from the user;
record an operation activity and an identity (ID) of the application that starts the recording function; and
terminate the application that starts the recording function according to the operation activity and the ID and without user interaction when the application that starts the recording function is running.

10. The mobile phone according to claim 9, wherein the processor being configured to determine whether the application that starts the recording function is connected to the network comprises the processor being further configured to:
acquire the ID of the application that starts the recording function;
periodically query for a network layer interface of the mobile phone according to the ID of the application that starts the recording function; and
determine that the application that starts the recording function is connected to the network when the application that starts the recording function sends or receives network data through the network layer interface.

11. The mobile phone according to claim 9, wherein the processor being configured to determine whether the mobile phone is participating in the conversation comprises the processor being further configured to:
periodically query for a working state of a communication module of the mobile phone; and
determine that the mobile phone is participating in the conversation when the communication module is in the communication state.

12. The mobile phone according to claim 9, wherein the processor being configured to determine whether the mobile phone has the application that starts the recording function comprises the processor being further configured to:
periodically query for a working state of a recording service module of the mobile phone; and determine that the mobile phone has an application that starts the recording function when the recording service module is in a recording state.

13. The mobile phone according to claim 9, wherein the processor being configured to determine whether the mobile phone is participating in the conversation comprises the processor being further configured to receive a communication state indication reported by a communication module, and wherein the communication state indication is reported by the communication module after the communication module enters a communication state and determines, according to the communication state indication, that the mobile phone is participating in the conversation.

14. The mobile phone according to claim 9, wherein the processor being configured to determine whether the mobile phone has the application that starts the recording function comprises the processor being further configured to receive a recording notification message reported by a recording service module, and wherein the recording notification message is reported by the recording service module after the recording service module enters a recording state and determines, according to the recording notification message, that the mobile phone has the application that starts the recording function.

15. A method for detecting an eavesdropping activity, comprising:
determining, by a mobile phone, whether the mobile phone is participating in a conversation;
determining, by the mobile phone, whether the mobile phone has an application that starts a recording function when the mobile phone is participating in the conversation;
determining, by the mobile phone, whether the application that starts the recording function is connected to a network;
sending out, by the mobile phone, a first-grade eavesdropping alarm prompt when the application that starts the recording function is not connected to the network, wherein the first-grade eavesdropping alarm prompt is at least one of a first volume of sound or a first strength of vibration; and
sending out, by the mobile phone, a second-grade eavesdropping alarm prompt when the application that starts the recording function is connected to the network, wherein the second-grade eavesdropping alarm prompt is at least one of a second volume of sound or a second strength of vibration.

16. The method for detecting the eavesdropping activity according to claim 15, wherein determining, by the mobile phone, whether the application that starts the recording function is connected to the network comprises:
acquiring an identity (ID) of the application that starts the recording function;
periodically querying for a network layer interface of the mobile phone according to the ID of the application that starts the recording function; and
determining that the application that starts the recording function is connected to the network when the application that starts the recording function sends or receives network data through the network layer interface.

17. The method for detecting the eavesdropping activity according to claim 15, wherein determining, by the mobile phone, whether the mobile phone is participating in the conversation comprises:
periodically querying for a working state of a communication module of the mobile phone; and
determining that the mobile phone is participating in the conversation when the communication module is in the communication state.

18. The method for detecting the eavesdropping activity according to claim 17, wherein before receiving, by the mobile phone, the communication state indication reported by the communication module, the method further comprises sending, by the mobile phone, a first registration request to the communication module, and wherein the first registration request is used for enabling the communication module to report the communication state indication when the communication module enters the communication state.

19. The method for detecting the eavesdropping activity according to claim 15, wherein determining, by the mobile phone, whether the mobile phone has the application that starts the recording function comprises:
periodically querying for a working state of a recording service module of the mobile phone; and
determining that the mobile phone has an application that starts the recording function when the recording service module is in a recording state.

20. The method for detecting the eavesdropping activity according to claim 15, wherein determining, by the mobile phone, whether the mobile phone is participating in the conversation comprises receiving a communication state indication reported by a communication module, wherein the communication state indication is reported by the communication module after the communication module enters a communication state and determines, according to the communication state indication, that the mobile phone is participating in the conversation, wherein determining, by the mobile phone, whether the mobile phone has the application that starts the recording function comprises receiving a recording notification message reported by a recording service module, and wherein the recording notification message is reported by the recording service module after the recording service module enters a recording state and determines, according to the recording notification message, that the mobile phone has the application that starts the recording function.

21. A mobile phone, comprising:
at least one processor; and
a memory,
wherein the memory is configured to store an executable program code, and
wherein the processor reads the executable program code stored in the memory to run a program corresponding to the executable program code, and wherein the processor is configured to:
determine whether the mobile phone is participating in a conversation;
determine whether the mobile phone has an application that starts a recording function when the mobile phone is participating in the conversation;
determine whether the application that starts the recording function is connected to a network;
send out a first-grade eavesdropping alarm prompt when the application that starts the recording function is not connected to the network, wherein the first-grade eavesdropping alarm prompt is at least one of a first volume of sound or a first strength of vibration; and
send out a second-grade eavesdropping alarm prompt when the application that starts the recording function is connected to the network, wherein the second-grade eavesdropping alarm prompt is at least one of a second volume of sound or a second strength of vibration.

22. The mobile phone according to claim 21, wherein the processor being configured to determine whether the mobile phone is participating in the conversation comprises the processor being further configured to:
periodically query for a working state of a communication module of the mobile phone; and
determine that the mobile phone is participating in the conversation when the communication module is in the communication state.

23. The mobile phone according to claim 21, wherein the processor being configured to determine whether the mobile phone has the application that starts the recording function comprises the processor being further configured to:
periodically query for a working state of a recording service module of the mobile phone; and
determine that the mobile phone has an application that starts the recording function when the recording service module is in a recording state.

24. The mobile phone according to claim 21, wherein the processor being configured to determine whether the mobile phone is participating in the conversation comprises the processor being further configured to receive a communication state indication reported by a communication module, wherein the communication state indication is reported by the communication module after the communication module enters a communication state and determines, according to the communication state indication, that the mobile phone is participating in the conversation, wherein the processor being configured to determine whether the mobile phone has the application that starts the recording function comprises the processor being further configured to receive a recording notification message reported by a recording service module, and wherein the recording notification message is reported by the recording service module after the recording service module enters a recording state and determines, according to the recording notification message, that the mobile phone has the application that starts the recording function.

* * * * *